(12) United States Patent
Senda

(10) Patent No.: US 8,970,463 B2
(45) Date of Patent: Mar. 3, 2015

(54) SIGNAL TRANSMISSION APPARATUS AND IMAGING DISPLAY SYSTEM

(75) Inventor: Michiru Senda, Kanagawa (JP)

(73) Assignee: Sony Corporation (JP)

( * ) Notice: Subject to any disclaimer, the term of this patent is extended or adjusted under 35 U.S.C. 154(b) by 317 days.

(21) Appl. No.: 13/468,403

(22) Filed: May 10, 2012

(65) Prior Publication Data

US 2012/0299804 A1 Nov. 29, 2012

(30) Foreign Application Priority Data

May 23, 2011 (JP) ................... 2011-114827

(51) Int. Cl.
 G09G 3/36 (2006.01)
 H04N 5/374 (2011.01)
 H04N 5/32 (2006.01)

(52) U.S. Cl.
 CPC . *H04N 5/374* (2013.01); *H04N 5/32* (2013.01)
 USPC ................ 345/98; 345/87; 345/100; 345/204

(58) Field of Classification Search
 CPC . G09G 3/3688; G09G 3/3685; G09G 3/3648; G09G 3/3655
 USPC ....................... 345/76–78, 100, 204, 211–212
 See application file for complete search history.

(56) References Cited

U.S. PATENT DOCUMENTS

| 6,493,047 | B2 * | 12/2002 | Ha .................................. 349/40 |
| 8,427,460 | B2 * | 4/2013 | Wu et al. ....................... 345/205 |
| 2006/0017672 | A1 * | 1/2006 | Aoki ............................... 345/77 |
| 2008/0111803 | A1 * | 5/2008 | Lee et al. ...................... 345/205 |
| 2009/0302202 | A1 * | 12/2009 | Sato et al. .................. 250/208.1 |
| 2011/0157127 | A1 * | 6/2011 | Jun ............................... 345/211 |

FOREIGN PATENT DOCUMENTS

JP 2007-294900 11/2007

* cited by examiner

*Primary Examiner* — Jennifer Nguyen
(74) *Attorney, Agent, or Firm* — Sheridan Ross P.C.

(57) ABSTRACT

A signal transmission apparatus including electrostatic discharge protection circuits arranged between a signal line and a wiring line of plural pixel wiring lines, each having a first transistor and a capacitor device; and a first control line connected to the electrostatic discharge protection circuits, wherein, in the electrostatic discharge protection circuit, a gate of the first transistor is connected to the first control line, one of a source and a drain in the first transistor is connected to one signal line and one terminal of the capacitor device as well as the other is connected to another wiring line, and the other terminal of the capacitor device is connected to the gate of the first transistor.

13 Claims, 15 Drawing Sheets

COMPARATIVE EXAMPLE 1

COMPARATIVE EXAMPLE 1

COMPARATIVE EXAMPLE 2

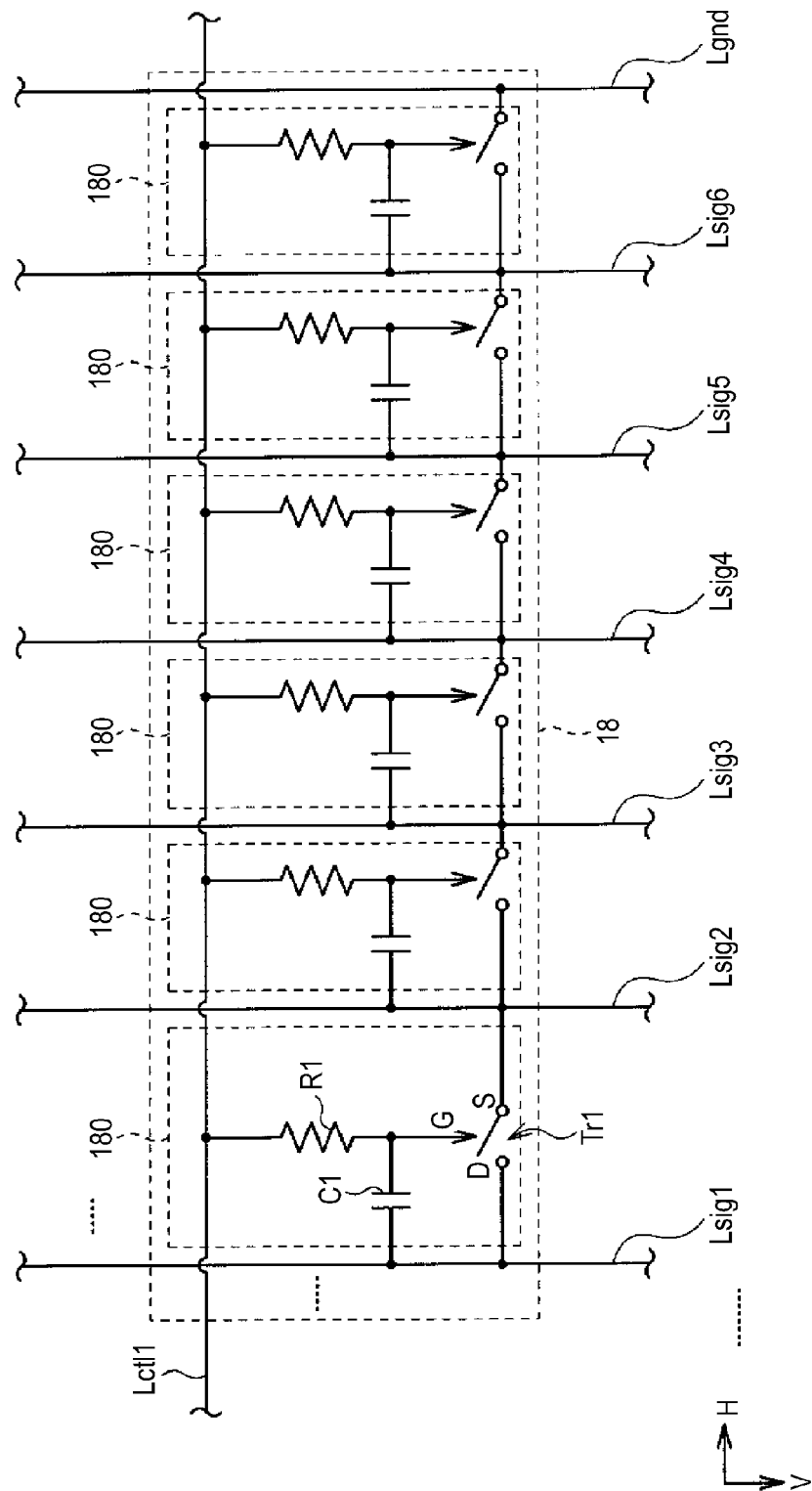

DEVICE POWER OFF-STATE
(AT THE TIME OF INPUTTING STATIC
ELECTRICITY OF NEGATIVE CHARGES)

SIGNAL TRANSMISSION APPARATUS AND IMAGING DISPLAY SYSTEM

FIELD

The present disclosure relates to a signal transmission device performing at least one operation (signal transmission operation) of an input operation or an output operation of signals and an imaging display system having an imaging apparatus performing the input operation (imaging operation) of signals.

BACKGROUND

In the signal transmission apparatus such as the imaging apparatus and a display apparatus, an electrostatic discharge protection circuit (ESD protection circuit) is generally provided for protecting inner devices (circuits) with respect to electrostatic input from the outside due to an electrostatic discharge (ESD) phenomenon. For example, an imaging apparatus in which the electrostatic discharge protection circuit is provided between signal lines is proposed in JP-A-2007-294900 (Patent Document 1).

SUMMARY

However, there may be a case where effective protection from static electricity is not made in the electrostatic discharge protection circuit disclosed in the above Patent Document 1, therefore, a proposal of a method capable of performing protection from static electricity more positively is requested.

In view of the above, it is desirable to provide a signal transmission apparatus and an imaging display system capable of performing protection from static electricity more positively.

An embodiment of the present disclosure is directed to a signal transmission apparatus including plural pixels performing at least one of an input operation and an output operation of signals, one or plural signal lines connected to the pixels, plural wiring lines including signal lines, one or plural electrostatic discharge protection circuits arranged between one signal line and another one wiring line of the plural wiring lines, each having a first transistor and a capacitor device, and a first control line connected to the electrostatic discharge protection circuits, in which, in the electrostatic discharge protection circuit, a gate of the first transistor is connected to the first control line directly or indirectly, one of a source and a drain in the first transistor is connected to one signal line and one terminal of the capacitor device as well as the other is connected to another one wiring line, and the other terminal of the capacitor device is connected to the gate of the first transistor.

Another embodiment of the present disclosure is directed to an imaging display system including an imaging apparatus, and a display device performing image display based on imaging signals obtained by the imaging apparatus, in which the imaging apparatus includes plural pixels performing an imaging operation, one or plural signal lines connected to the pixels, plural wiring lines including the signal lines, one or plural electrostatic discharge protection circuits arranged between one signal line and another one wiring line of the plural wiring lines, each having a first transistor and a capacitor device, and a first control line connected to the electrostatic discharge protection circuits, in which, in the electrostatic discharge protection circuit, a gate of the first transistor is connected to the first control line directly or indirectly, one of a source and a drain in the first transistor is connected to one signal line and one terminal of the capacitor device as well as the other is connected to another one wiring line, and the other terminal of the capacitor device is connected to the gate of the first transistor.

In the signal transmission apparatus and the imaging display system according to the embodiments of the present disclosure, for example, when static electricity is inputted to one of one signal line and another one wiring line when the device power is in the off-state, the electrostatic discharge protection circuit arranged between these wiring lines becomes in an active state. Specifically, the first transistor in the electrostatic discharge protection circuit is turned on in both cases where the static electricity includes positive charges and negative charges, and electrostatic charges are discharged in the direction of another one wire line in one signal line and another one wire line.

In the signal transmission apparatus and the imaging display system according to the embodiments of the present disclosure, the electrostatic discharge protection circuit are arranged between one signal line and another one wiring line, therefore, electrostatic charges can be discharged in the direction of another wiring line in both cases where static electricity inputted to one wiring line of these wiring lines includes positive charges and negative charges. Therefore, it is possible to perform protection from static electricity more positively.

BRIEF DESCRIPTION OF THE DRAWINGS

FIG. 10 is a circuit diagram showing an operation example in the electrostatic discharge protection unit shown in FIG. 4 when a device power is in an on-state;

DETAILED DESCRIPTION

Hereinafter, embodiments of the present disclosure will be explained with reference to the drawings. The explanation will be made in the following order.

1. Embodiment (Example of a unit circuit having an N-type first transistor, a capacitor device and a resistor device)
2. Modification Examples
    Modification Example 1 (Example of a unit circuit having a P-type first transistor, the capacitor device and the resistor device)
    Modification of Example 2 (Example of a unit circuit having a second transistor as the resistor device)
    Modification Example 3 (Example of a unit circuit having the first transistor and the capacitor device)
    Modification Examples 4 to 6 (Other configuration examples of imaging units)
3. Application Example (Example of an imaging display system having an imaging apparatus according to the embodiment and respective modification examples)
4. Other Modification Examples (Examples of applying an electrostatic discharge protection unit to a display apparatus)<

EMBODIMENT

Configuration of an Imaging Apparatus 1

Figure 1:
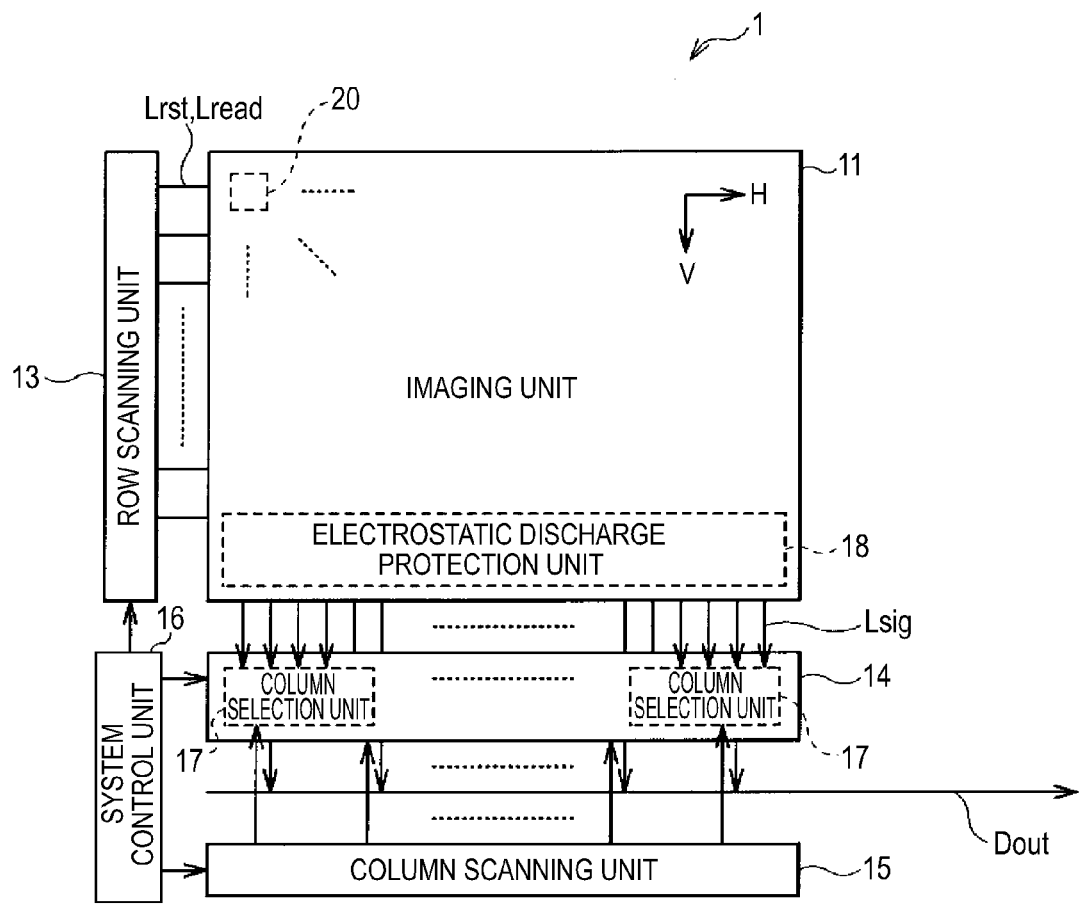
FIG. 1 is a block diagram showing an entire configuration of an imaging apparatus as a signal transmission apparatus according to an embodiment of the present disclosure.

FIG. 1 shows an entire block configuration of an imaging apparatus (imaging apparatus 1) as a signal transmission apparatus according to an embodiment of the present disclosure. The imaging apparatus 1 performs an input operation (imaging operation) of signals, and specifically, reads information of an object (images the object) based on imaging light. The imaging apparatus 1 includes an imaging unit 11, a row scanning unit 13, an A/D conversion unit 14, a column scanning unit 15, a system control unit 16 and an electrostatic discharge protection unit 18.

(Imaging Unit 11)

The imaging unit 11 is an imaging area in which electric signals corresponding to incident imaging light are generated. In the imaging unit 11, pixels (imaging pixels) 20 having photoelectric conversion units (later-described photoelectric conversion devices 21) generating photocharges of a charge amount corresponding to alight amount of incident imaging light to be accumulated inside are two-dimensionally arranged in a matrix state. In other words, the input operation (imaging operation) of signals is performed in these plural pixels 20. As shown in FIG. 1, explanation will be made by defining the horizontal direction (row direction) in the imaging unit 11 as an "H" direction and the vertical direction (column direction) is a "V" direction as the following description.

Figure 2:
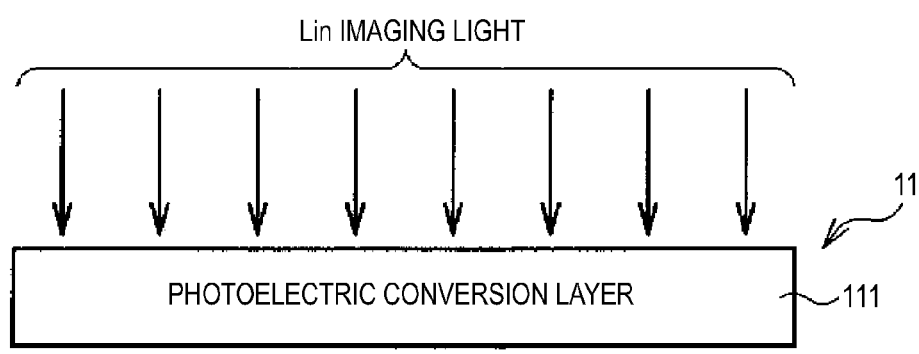
FIG. 2 is a schematic view showing an outline configuration example of an imaging unit shown in FIG. 1.

FIG. 2 shows an outline configuration example of the imaging unit 11. In the imaging unit 11, a photoelectric conversion layer 111 in which the above pixels 20 are arranged in the matrix state. In the photoelectric layer 111, information based on incident imaging light Lin is read as shown in the drawing.

Figure 3:
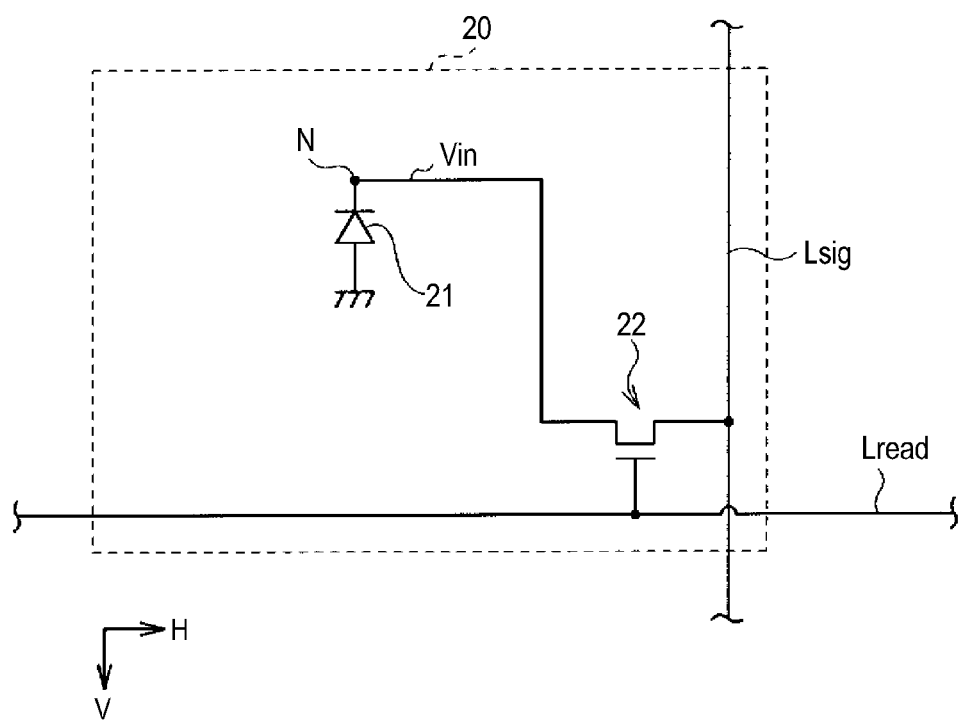
FIG. 3 is a circuit diagram showing a detailed configuration example of a pixel shown in FIG. 1.

FIG. 3 shows a circuit configuration example of the pixel 20. In the pixel 20, one photoelectric conversion device 21 and one transistor 22 are provided. There are also provided a readout control line Lread extending along the H-direction and a signal line Lsig extending along the V-direction are connected to the pixel 20.

The photoelectric conversion device 21 is formed by, for example, a PIN (Positive Intrinsic Negative) type photodiode and generates signal charges of the charge amount corresponding to the light amount of incident light (imaging light Lin). A cathode of the photoelectric conversion device 21 is connected to an accumulation node N.

The transistor 22 is a transistor for outputting the signal charges (an input voltage Vin) generated in the photoelectric conversion device 21 to the signal line $L_{sig}$ when turned on in accordance with a row scanning signal supplied from the readout control line Lread. The transistor 22 is formed by an N-channel (N-type) field-effect transistor (FET) in this case. The transistor 22 may be formed by a P-channel (P-type) FET or the like. The transistor 22 is made of, for example, silicon-based semiconductors such as microcrystalline silicon or polycrystalline silicon. It is also possible to use oxide semiconductors such as iridium gallium zinc oxide (InGaZnO) or zinc oxide (ZnO). As the microcrystalline silicon, the polycrystalline silicon (polysilicon) and oxide semiconductors have higher mobility μ than amorphous silicon, for example, it is possible to read signals at high speed by the transistor 22.

In the pixel 20, agate of the transistor 22 is connected to the readout control line Lread, a source is connected to the signal line Lsig and a drain is connected to the cathode (accumulation node N) of the photoelectric device 21. An anode of the photoelectric conversion device 21 is connected to the ground.

(Electrostatic Discharge Protection Unit 18)

The electrostatic discharge protection unit 18 has a function (ESD protection function) of protecting internal devices (specifically, the transistor 22, the photoelectric device 21 and so on in the pixel 20) with respect to electrostatic input from the outside caused by the ESD phenomenon. Specifically, the electrostatic discharge protection unit 18 plays a role of protecting the inner devices from static electricity to be inputted through the signal lines Lsig and so on. Though the example in which the electrostatic discharge protection unit 18 is arranged in the imaging area (imaging unit 11) is shown, the present technique is not limited to the example.

Figure 4:
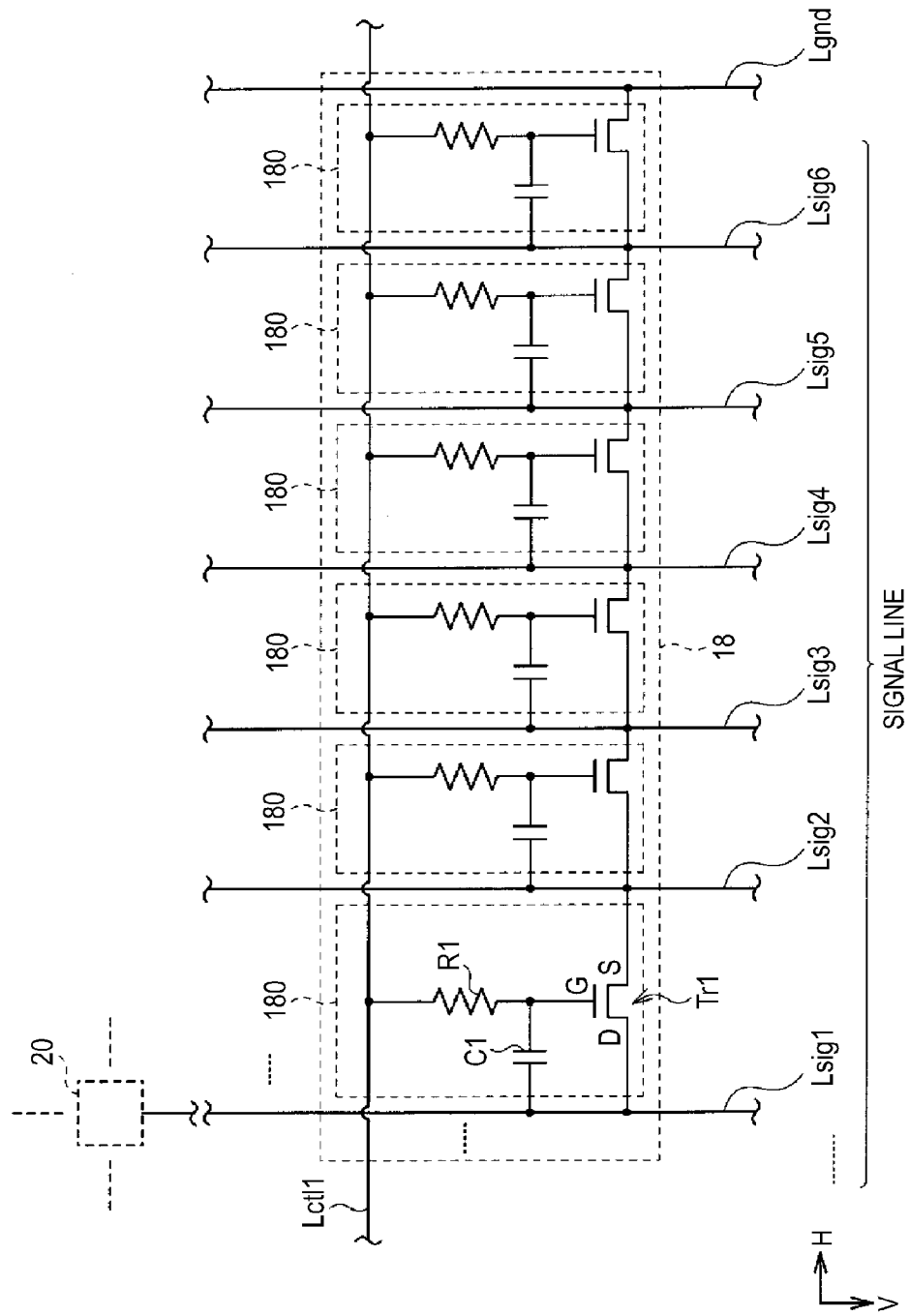
FIG. 4 is a circuit diagram showing a detailed configuration example of an electrostatic discharge protection unit shown in FIG. 1.

FIG. 4 shows a circuit configuration example of the electrostatic discharge protection unit 18. The electrostatic discharge protection unit 18 includes plural unit circuits 180 (electrostatic discharge protection circuits) extending along the H-direction. In this case, six signal lines shown in the drawing are denoted by Lsig1 to Lsig6 for convenience.

The unit circuit 180 is arranged between one signal line Lsig and another one wiring line of plural wiring lines including signal lines Lsig, a grounding wire Lgnd and power supply lines (not shown). Specifically, the unit circuit 180 is arranged between one signal line Lsig and another one signal line Lsig (between a pair of adjacent signal lines Lsig), between one signal line Lsig and one grounding wire Lgnd or between one signal line Lsig and one power supply line (not shown). In the example shown in FIG. 4, the unit circuit 180 is arranged between the signal lines Lsig1 and Lsig2, between the signal lines Lsig2 and Lsig3, between the signal lines Lsig3 and Lsig4, between the signal lines Lsig4 and Lsig5, between the signal lines Lsig5 and Lsig6 (corresponding to a specific example of a "first protection circuit" in the embodiment of the present disclosure. The unit circuit 180 is also arranged between the signal line Lsig6 and the grounding wire Lgnd (corresponding to a specific example of a "second protection circuit" in the embodiment of the present disclosure). In the electrostatic discharge protection unit 18 shown in FIG. 4, plural unit circuits 180 (the above described "first protection circuit" and the "second protection circuit") are arranged continuously (adjacent to one another) between adjacent plural wiring lines (plural signal lines Lsig1 to Lsig6, the grounding wire Lgnd and the like in this case). The grounding wire Lgnd and the power supply line (not shown) are arranged at, for example, an end area in the imaging unit 11 (for example, a right-end portion or a left-end portion along the H-direction).

The unit circuit 180 includes a transistor Tr1 (first transistor), a capacitor device C1 and a resistor device R1. The transistor Tr1 is formed by the N-channel (N-type) FEF in this case. A gate, a source and a drain of the transistor Tr1 are denoted by "G", "S" and "D" in FIG. 4, which are the same in other subsequent drawings. A protection control line Lctl1 (first control line) extending along the H-direction is connected to respective unit circuits 180.

In the unit circuit 180, the gate of the transistor Tr1 is indirectly connected to the protection control line Lctl1 through the resistor device R1. That is, one terminal of the resistor device R1 is connected to the protection control line Lctl1 and the other terminal of the resistor device R1 is connected to the gate of the transistor Tr1. One of the source and the drain (the drain in this case) of the transistor Tr1 is connected to one signal line Lsig and one terminal of the capacitor device C1 and the other (the source in this case) is connected to the another one wiring line (the signal line Lsig or the grounding wire Lgnd in this case). The other terminal of the capacitor device C1 is connected to the gate of the transistor Tr1 and the other terminal of the resistor device R1.

Figure 5:
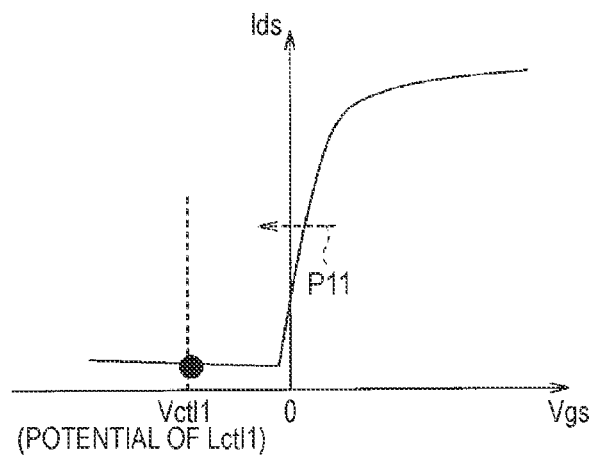
FIG. 5 is a view showing a characteristic example of a transistor shown in FIG. 4.
Figure 6:
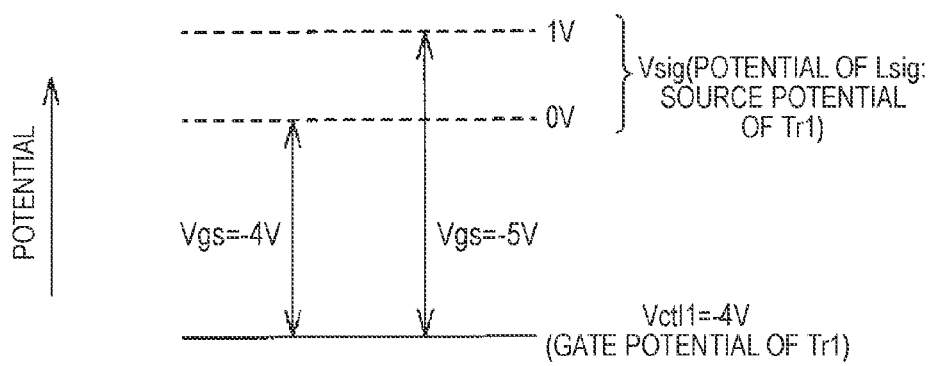
FIG. 6 is a schematic view showing a potential setting example in the transistor shown in FIG. 4.

Here, a potential Vctl1 of the protection control line Lctl1 is set so that the transistor Tr1 is in an off-state when the power (device power) of the imaging apparatus 1 is in an on-state (device operational state). Specifically, the potential Vctl1 of the protection control line Lctl1 is set to be lower than a potential (signal voltage) Vsig of the signal line Lsig so as to satisfy a gate-source voltage Vgs<0 in the transistor Tr1 as shown, for example, in FIG. 5. As shown in, for example, FIG. 6, even when the potential Vsig of the signal line Lsig (corresponding to a source potential of the transistor Tr1) changes (changes between 0V to 1V in this case), the potential Vctl1 of the protection control line Lctl1 (corresponding to a gate potential of the transistor Tr1) is set so as to satisfy Vgs<0. Accordingly, it is possible to suppress leakage current (leakage current in the off-state) in the transistor Tr1 to be low even when a threshold voltage Vth of the transistor Tr1 changes to the negative side to some degree as shown by an arrow P11 in FIG. 5. Therefore, adverse effects (reduction of the charge amount and the like) to an operation of reading out signals (charges) from respective pixels 20 due to the leakage current in the transistor Tr1 can be suppressed when the device power is in the on-state. That is, potential variation (disappearance of charges) in the signal lines Lsig can be reduced or avoided in the case where the pixel 20 has a so-called passive circuit configuration (a configuration not having an amplifier such as a source-follower circuit in the pixel 20).

The row scanning unit 13 shown in FIG. 1 is formed by including, for example, a shift resistor, an address decoder and the like, which is a pixel drive unit driving respective pixels 20 in the imaging unit 11, for example, on a row basis. The driving on a row basis is realized by supplying the row scanning signal through the readout control line Lread.

The A/D conversion unit 14 includes plural column selection units 17 provided every plural (four in this case) signal lines Lsig as shown in FIG. 1, performing A/D conversion (analog/digital conversion) based on a signal voltage inputted through the signal lines Lsig. Each column selection unit 17 includes, for example, an amplifier, a capacitor device (capacitor), a switch, a sample/hold (S/H) circuit, a horizontal selection switch, an A/D converter and so on (all not shown). In the A/D conversion unit 14 having the above configuration, output data Dout (imaging signals) including digital signals is generated to be outputted to the outside.

The column scanning unit 15 is formed by including, for example, the shift resistor, the address decoder and the like, which sequentially drives respective horizontal selection switches (not shown) in the column selection units 17 while performing scanning. According to the selective scanning by the column scanning unit 15, signals (the above-described output data Dout) of respective pixels 20 transmitted through respective signal lines Lsig are sequentially outputted.

The system control unit 16 controls operations of the row scanning unit 13, the A/D conversion unit 14, the column scanning unit 15 and so on. Specifically, the system control unit 16 includes a timing generator generating various timing signals, performing drive control of the row scanning unit 13, the A/D conversion unit 14, the column scanning unit 15 and so on based on various timing signals generated in the timing generator. The output data Dout can be acquired from the imaging unit 11 by performing imaging driving (sequential scanning) with respect to plural pixels 20 in the imaging unit 11 by the row scanning unit 13, the A/D conversion unit 14 and the column scanning unit 15 respectively under control by the system control unit 16.

Operation and Effect of Imaging Apparatus 1

1. Basic Operation

In the imaging apparatus 1, when the imaging light Lin is incident on the imaging unit 11 as shown in FIG. 2, the imaging light Lin is converted (photoelectric conversion) into signal charges in the photoelectric conversion layer 111 (the photoelectric conversion devices 21 in respective pixels 20 shown in FIG. 3). Voltage change corresponding to the accumulation node capacitance occurs in the accumulation node N due to charges generated by the photoelectric conversion. Specifically, when the accumulation node capacitance is "Cs" and a generated charge is "q", voltage is reduced in the accumulation node N by (q/Cs). The input voltage Vin (signal charges generated in the photoelectric conversion device 21) is applied to the drain of the transistor 22 in accordance with the voltage change. When the transistor 22 is turned on in accordance with the row scanning signal supplied from the readout control line Lread, charges of the input voltage Vin supplied to the transistor 22 are outputted (read out) to the signal line Lsig.

The signals read out as described above are inputted to column selection units 17 in the A/D conversion unit 14 in units of plural (four in this case) pixel columns through the signal lines Lsig. In the column selection units 17, first, Q-V conversion is performed in a charge amplifier and the like in each signal charge inputted from respective lines Lsig to perform conversion from signal charges to the signal voltage. Next, A/D conversion is performed in each converted signal voltage to generate output data Dout (imaging signals) including digital signals. In this manner, the output data Dout is sequentially outputted from respective column selection units 17 and transmitted to the outside.

2. Operation of Electrostatic Discharge Protection Unit

Next, the operation of the electrostatic discharge protection unit 18 (unit circuit 18) which is one of features of the embodiment will be explained in detail by being compared with comparative examples (comparative examples 1 and 2).

2-1. Comparative Example 1

Figure 7:
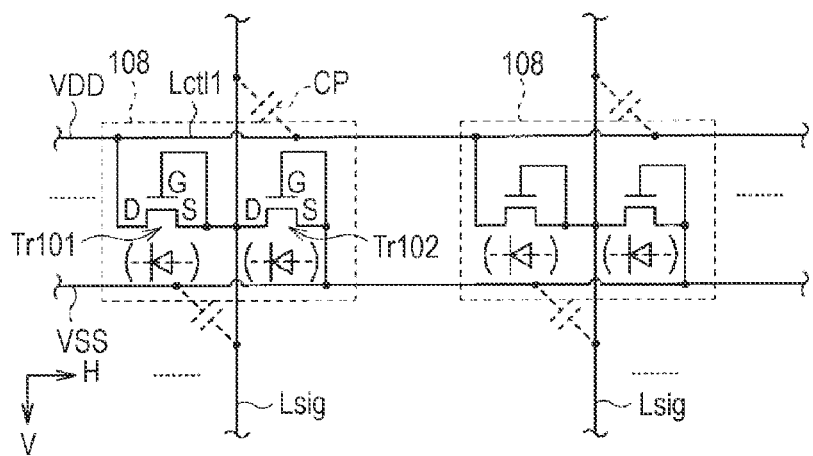
FIG. 7 is a circuit diagram showing a configuration example of an electrostatic discharge protection unit according to a comparative example 1.

FIG. 7 shows a circuit configuration of the electrostatic discharge protection unit according to a comparative example 1. The electrostatic discharge protection unit in the comparative example 1 includes plural unit circuits (electrostatic discharge protection circuits) 108 extending along the H-direction.

The unit circuit 108 includes two transistors Tr101, Tr102 formed by the N-channel (N-type) FET. The signal line Lsig extending along the V-direction, a power supply line VDD extending along the H-direction and a power supply line VSS (grounding wire) are connected to each unit circuit 108. In the unit circuit 108, both a gate and a source of the transistor Tr101 are connected to the signal line Lsig and a drain of the transistor Tr101 is connected to the power supply line VDD. Additionally, both a gate and a source of the transistor Tr102 are connected to the power supply line VSS and a drain of the transistor Tr102 is connected to the signal line Lsig. According to the above circuit configuration, the transistors Tr101, Tr102 function as diodes (rectifying devices) with a direction shown by dashed lines in the drawing. That is, a diode in which an anode is connected to the power supply line VDD as well as a cathode is connected to the signal line Lsig and a diode in which an anode is connected to the signal line Lsig as well as a cathode is connected to the power supply line VSS are arranged.

In the unit circuit 108 having the above configuration, when static electricity of positive charges is inputted to the signal line Lsig, electrostatic charges are discharged to the power supply line VDD through the transistor Tr101. When static electricity of negative charges is inputted to the signal line Lsig, electrostatic charges are discharged to the power supply line VSS through the transistor Tr102. In this manner, internal devices are protected from static electricity inputted through the signal line Lsig in the comparative example 1.

Figure 8:
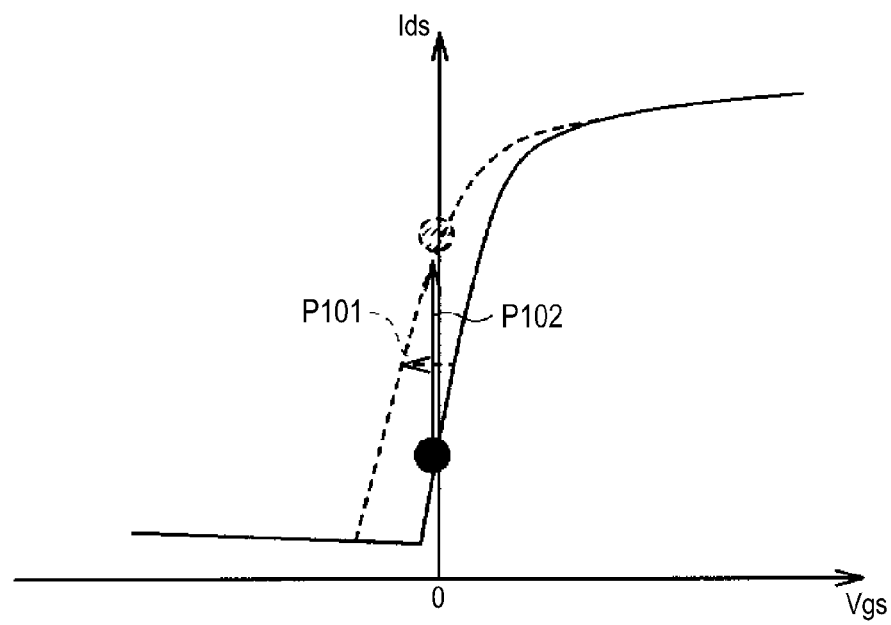
FIG. 8 is a view showing a characteristic example of a transistor shown in FIG. 7.

However, in the electrostatic discharge protection unit in the comparative example 1, the source and the gate are connected to each other in the transistors Tr101 and Tr102, and both transistors are constantly set to Vgs=0V, therefore, the following problems occur. That is, for example, as shown in an arrow P101 in FIG. 8, leakage current in the transistors Tr101 and Tr102 drastically increases when the threshold voltage Vth in the transistors Tr101 and Tr102 changed to the negative side to some degree (see an arrow P102 in FIG. 8). Accordingly, potential variation (disappearance of charges) in the signal lines Lsig occurs at the time of reading out signals (charges) from each pixel 20. Therefore, image deterioration such as a line defect in a taken image may occur in the case of the above-described passive pixel circuit configuration.

Also in the electrostatic discharge protection unit in the comparative example 1, the respective signal lines Lsig and two power supply lines VDD and VSS cross each other, therefore, the following problems also occur. That is, parasitic capacitance Cp (shown by dashed lines in FIG. 7) formed between these wiring lines increases, which increases power consumption or rounds a voltage waveform in the signal lines Lsig.

2-2. Comparative Example 2

Figure 9:
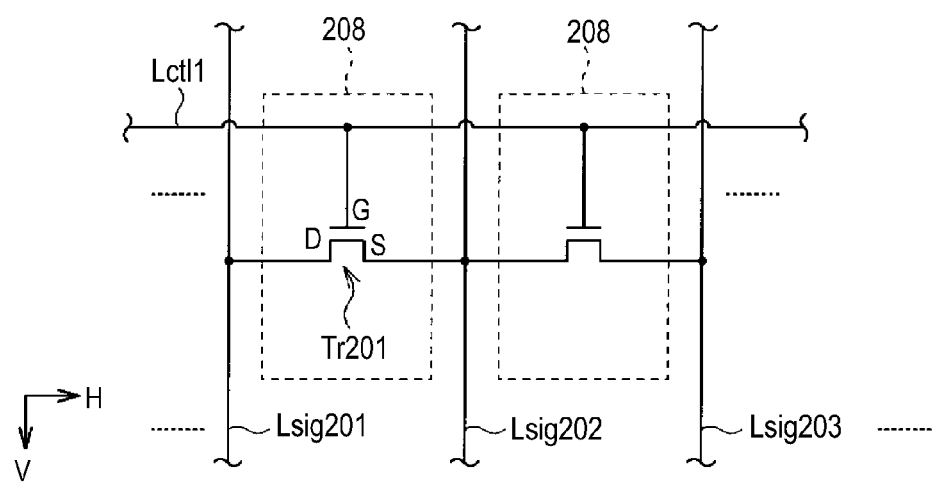
FIG. 9 is a circuit diagram showing a configuration example of an electrostatic discharge protection unit according to a comparative example 2.

FIG. 9 shows a circuit configuration of the electrostatic discharge protection unit according to a comparative example 2. The electrostatic discharge protection unit in the comparative example 2 includes plural unit circuits (electrostatic discharge protection circuits) 208 extending along the H-direction. In respective unit circuit 208, plural signal lines extending along the V-direction (three signal lines Lsig 201 to Lsig 203 are shown here) and one protection control line Lctl1 extending along the H-direction are connected. Each unit circuit 208 is arranged between a pair of adjacent signal lines (between signal lines Lsig 201 and Lsig 202 as well as between signal lines Lsig 202 and Lsig 203).

The unit circuit 208 includes a transistor Tr201 formed by the N-channel (N-type) FET. In the unit circuit 208, a gate of the transistor Tr201 is connected to the protection control line Lctl1, a source is connected to one of the pair of signal lines and a drain is connected to the other signal line.

According to the above configuration, in the case where static electricity of negative charges is inputted to one signal line, for example, when the device power is in the off state (device stop state) in the unit circuit 208, Vgs becomes higher than "0" and the transistor Tr201 is turned on, therefore, the electrostatic charges are discharged to a direction of the other signal line. Accordingly, the internal devices are protected from static electricity of negative charges inputted through the signal line Lsig in the comparative example 2.

However, in the case where static electricity of positive charges are inputted to one signal line, for example, when the device power is in the off-state, Vgs is maintained to be lower than "0" (Vgs does not become higher than "0"), therefore, the transistor Tr201 is not turned on and electrostatic charges are not discharged in the direction of the other signal line. That is, the electrostatic discharge protection unit of the comparative example 2 effectively operates when static electricity has negative charges (internal devices are effectively protected), however, the electrostatic discharge protection unit does not operate effectively when static electricity has positive charges (internal devices are not effectively protected). As described above, there may be a case where effective protection from static electricity is not performed when the device power is in the off-state.

Also in the electrostatic discharge protection unit of the comparative example 2, every unit circuit 208 is arranged between a pair of signal lines (each unit circuit 208 is not connected to the power supply line or the grounding wire), which is different from the electrostatic discharge protection unit according to the present embodiment, therefore, the following problems may occur. That is, there is not a definitive discharge path for electrostatic charges inputted through the signal lines, therefore, discharge effects of the electric field (protection function from static electricity) is insufficient and part of devices is not sufficiently protected in some cases.

2-3. Present Embodiment

Whereas in the present embodiment, plural unit circuits 180 having the configuration shown in FIG. 4 are provided inside the electrostatic discharge protection unit 18, therefore, operations described below are performed in respective unit circuit 180, as a result, protection from static electricity is performed more positively than in the above comparative examples 1 and 2.

(A. When the Device Power is in the On-State)

First, the potential Vctl1 of the protection control line Lctl1 is set so that the transistor Tr1 is in the off-state when the device power is in the on-state. Accordingly, the transistors Tr1 are constantly in the off-state in respective unit circuits 180 in the electrostatic discharge protection unit 18 when the device power is in the on-state, for example, as shown in FIG. 10. That is, the electrostatic discharge protection unit 18 is in an invalid state (inactive state) when the device power is in the on-state. In this case, respective transistors Tr1 are shown as switches in FIG. 10 as well as later described FIGS. 11A, 11B and FIGS. 12A, 12B for convenience.

(B. When the Device Power is in the Off-State)

On the other hand, when the device power is in the off-state, respective signal lines Lsig and the protection control line Lctl1 are respectively in a floating state and the electrostatic discharge protection unit 18 is in a valid state (active state) as shown below in FIGS. 11A, 11B and FIGS. 12A, 12B. The same applies to the case where nothing is connected with respect to the imaging unit 11 (for example, in manufacturing processes of the imaging unit 11). In FIGS. 11A, 11B and FIGS. 12A, 12B, six unit circuits 180 shown in the electrostatic protection unit 18 are denoted by unit circuits 180-1 to 180-6 for convenience.

(When Static Electricity of Positive Charges is Inputted)

Figure 11A:
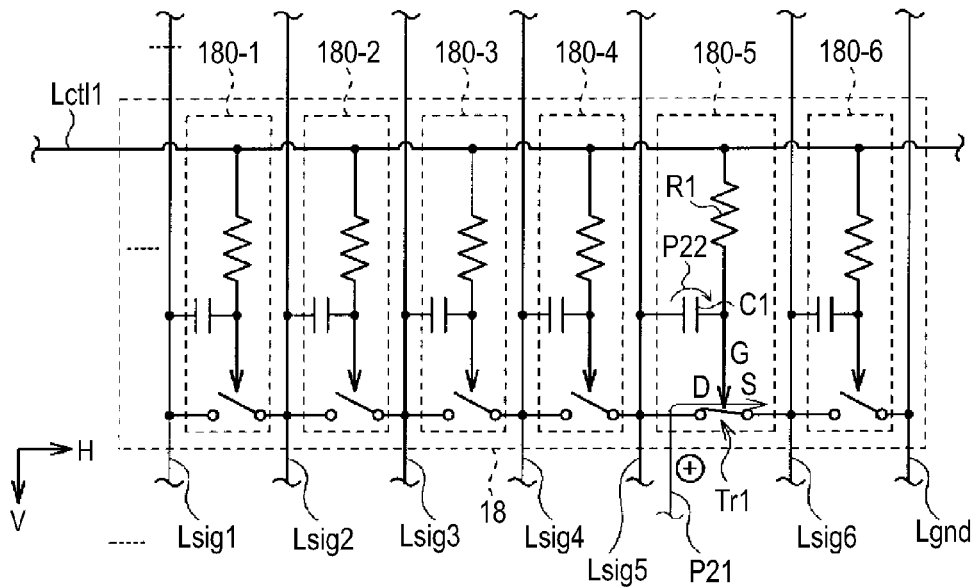
FIGS. 11A and 11B are circuit diagrams showing an operation example in the electrostatic discharge protection unit shown in FIG. 4 when the device power is in an off-state (at the time of inputting static electricity of positive charges)

Here, for example, when static electricity of positive charges is inputted through the signal line Lsig5 as shown in FIG. 11A (see an arrow P21 in the drawing), a source-drain voltage Vds becomes higher than "0" in the transistor Tr1 in the unit circuit 180-5. A gate potential of the transistor Tr1 is accordingly increased by capacitive coupling by the capacitor device C1 (see an arrow P22 in the drawing), the gate-source voltage Vgs becomes higher than "0". Therefore, the transistor Tr1 in the unit circuit 180-5 is selectively turned on and charges (positive charges) of static electricity inputted into the unit circuit 180-5 through the signal line Lsig5 are discharged to a direction of the source of the transistor Tr1 (direction of the signal line Lsig6) (see the arrow P21 in the drawing). That is, the two adjacent signal lines Lsig5 and Lsig6 are electrically short-circuited (short-circuited state). Additionally, a potential difference between the gate of the transistor Tr1 and the protection control line Lctl11 is maintained for a fixed period of time by the resistor device R1 in the unit circuit 180-5 at this time, therefore, a danger in which the transistor Tr1 is turned off (becomes in the off-state) in a moment of time is avoided. If the transistor Tr1 is turned off in a moment of time, it is difficult to discharge electrostatic charges inputted in the signal line Lsig5 to the signal line lsig6.

Figure 11B:
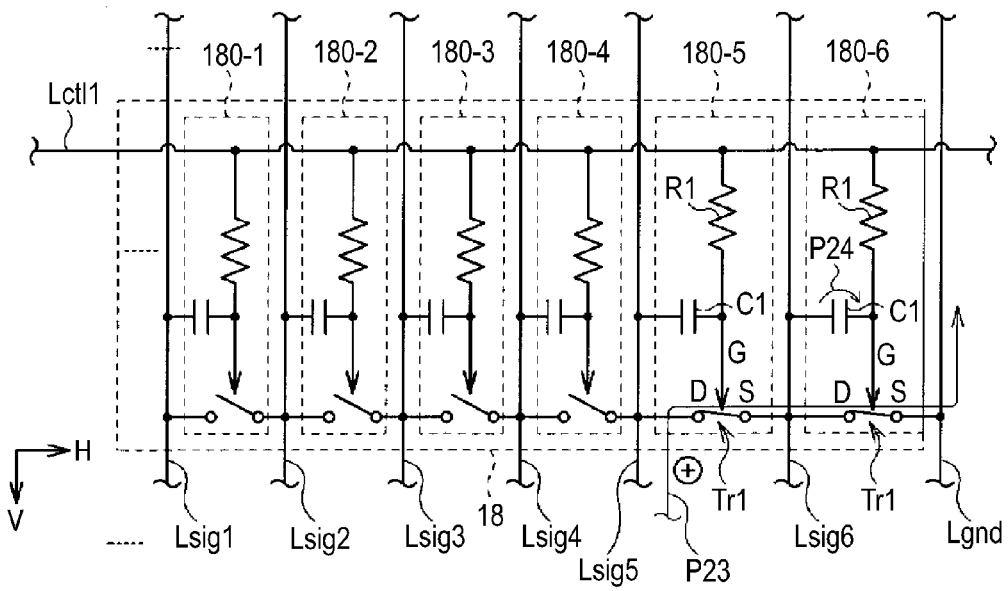

Next, for example, as shown in FIG. 11B, electrostatic charges (positive charges) discharged in the direction of the signal line Lsig6 are inputted to the unit circuit 180-6 adjacent to the unit circuit 180-5 (see an arrow P23 in the drawing). Then, the transistor Tr1 is selectively turned on also in the unit circuit 180-6 in the same manner as described above. That is, Vds becomes higher than "0" as well as the gate potential is increased by capacitive coupling by the capacitor device C1 (see an arrow P24 in the drawing), the gate-source voltage Vgs becomes higher than "0". Therefore, electrostatic charges (positive charges) inputted into the unit circuit 180-6 from the direction of the unit circuit 180-5 are discharged in the direction of the source of the transistor Tr1 (direction of the grounding wire Lgnd) (see the arrow P23 in the drawing). That is, the adjacent signal line Lsig6 and the grounding wire Lgnd are electrically short-circuited and electrostatic charges (positive charges) are finally discharged to the grounding wire Lgnd. In this manner, when static electricity of positive charges is inputted through the signal line Lsig when the device power is in the off-state, the transistors Tr1 becomes in the on-state one by one (sequentially) in the unit circuits 180 in the electrostatic discharge protection unit 18 and electrostatic charges are finally discharged to the power supply line (not shown) or the grounding wire Lgnd. As charges are sequentially distributed at this time, the potential is gradually reduced. As a result, protection from static electricity can be performed more positively than in the comparative examples 1 and 2.

(When Static Electricity of Negative Charges is Inputted)

Figure 12A:
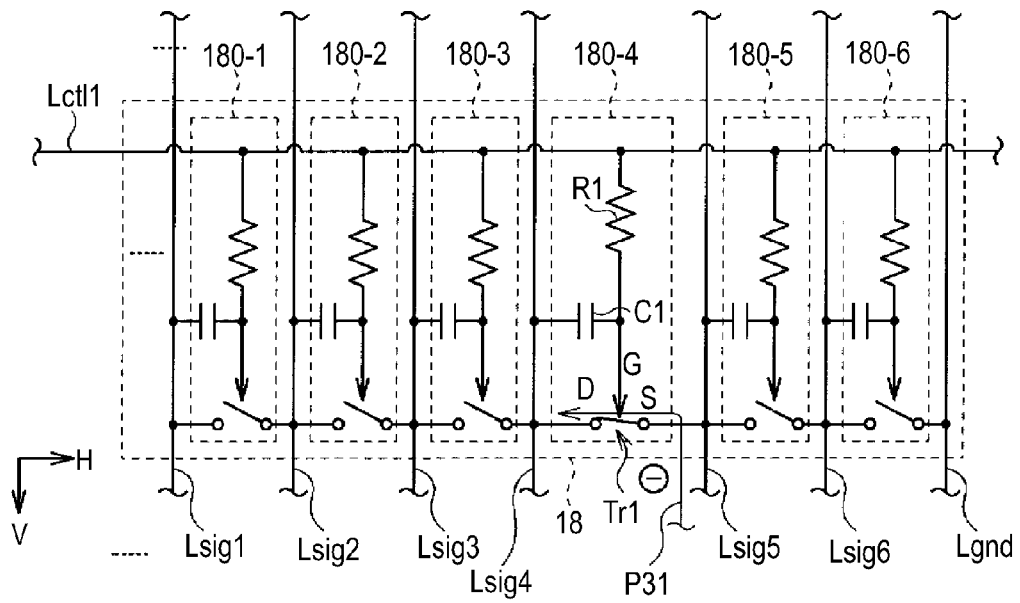
FIGS. 12A and 12B are circuit diagrams showing an operation example in the electrostatic discharge protection unit shown in FIG. 4 when the device power is in an off-state (at the time of inputting static electricity of negative charges)

On the other hand, for example, as shown in FIG. 12A, when static electricity of negative charges is inputted through the signal line Lsig5 as shown in FIG. 12A (see an arrow P31 in the drawing), the voltages become Vds>0 as well as Vgs>0 in the transistor Tr1 in the unit circuit 180-4 positioned in the direction reverse to the above case of positive charges. Therefore, the transistor Tr1 in the unit circuit 180-4 is selectively turned on and electrostatic charges (negative charges) inputted into the unit circuit 180-4 through the signal line Lsig5 are discharged to a direction of the drain of the transistor Tr1 (direction of the signal line Lsig4) (see the arrow P31 in the drawing). That is, two adjacent signal lines Lsig5 and Lsig4 are electrically short-circuited. As the potential difference between the gate of the transistor Tr1 and the protection control line Lctl1 is maintained for a fixed period of time also in this case due to the resistor device R1 in the unit circuit 180-4, the danger in which the transistor Tr1 is turned off in a moment of time is avoided.

Figure 12B:
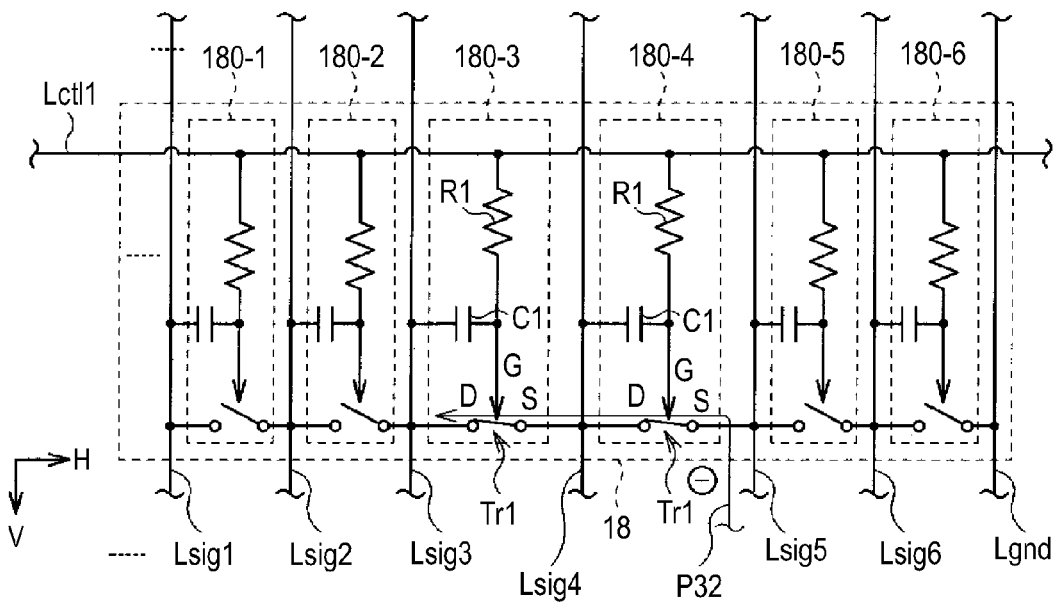

Next, for example, as shown in FIG. 12B, electrostatic charges (negative charges) discharged in the direction of the signal line Lsig4 are inputted to the unit circuit 180-3 adjacent to the unit circuit 180-4 (see an arrow P32 in the drawing). Then, the voltages become Vds>0 as well as Vgs>0 also in the unit circuit 180-3 also in the same manner as described above, and the transistor Tr1 is selectively turned on. Therefore, electrostatic charges (negative charges) inputted into the unit circuit 180-3 from the direction of the unit circuit 180-4 are discharged in a direction of the drain of the transistor Tr1 (direction of the signal line Lsig3) (see the arrow P32 in the drawing). That is, adjacent signal lines Lsig4 and Lsig3 are electrically short-circuited. The same operation is continuously performed in subsequent circuits, thereby discharging electrostatic charges (negative charges) are finally discharged to the power supply line (not shown) or the grounding wire Lgnd. In this manner, when static electricity of negative charges is inputted through the signal line Lsig when the device power is in the off-state, the transistors Tr1 becomes in the on-state one by one (sequentially) in the unit circuits 180 in the electrostatic discharge protection unit 18 and electrostatic charges are finally discharged to the power supply line (not shown) or the grounding wire Lgnd. As charges are sequentially distributed also at this time, the potential is gradually reduced. As a result, protection from static electricity can be performed more positively than in the comparative examples 1 and 2 also in this case.

As described above, the electrostatic discharge protection unit 18 having the unit circuits 180 is provided between one signal line Lsig and another one wiring line of plural wiring lines including the signal lines Lsig, the grounding wire line Lgnd and the power supply line (not shown), therefore, electrostatic charges can be discharged in the direction of another wiring line both in the cases where static electricity of positive charges and negative charges are inputted to one wiring line in these wiring lines. Accordingly, it is possible to perform protection from static electricity more positively (can improve electrostatic withstand voltage), therefore, characteristic variation of devices due to static electricity can be reduced as well as yield can be improved. Additionally, electrostatic charges are discharged by using charges of static electricity itself in the electrostatic discharge protection unit 18 as described above, therefore, the electrostatic withstand voltage can be improved without providing a special device separately.

When the device power is in the on-state, leakage current is controlled to be reduced even when the threshold voltage Vth of the transistors Tr1 and so on vary, therefore, potential variation (disappearance of charges) in the signal lines Lsig can be suppressed at the time of readout operation of signals (charges) from respective pixels 20. Therefore, it is possible to reduce occurrence of image deterioration such as a line defect in a taken image even when the pixels 20 have the passive circuit configuration described above.

Furthermore, the resistor device R1 is provided in the unit circuit 180, therefore, the potential difference between the gate of the transistor Tr1 and the protection control line Lctl1 can be maintained for a fixed period of time, which can avoid the transistor Tr1 from being turned off in a moment of time and can operate the electrostatic discharge protection unit 18 more positively.

Additionally, plural unit circuit 180 are arranged continuously between adjacent plural wiring lines (in this case, plural signal lines Lsig1 to Lsig6, the grounding wire Lgnd and the like), therefore, electrostatic charges can be finally discharged to the power supply line (not shown) or the grounding wire Lgnd and the protection from static electricity can be performed more positively.

MODIFICATION EXAMPLES

Subsequently, modification examples of the present embodiment (modification examples 1 to 6) will be explained. The same codes are given to the same components as in the embodiment and explanation thereof is appropriately omitted.

Modification Example 1

Figure 13:
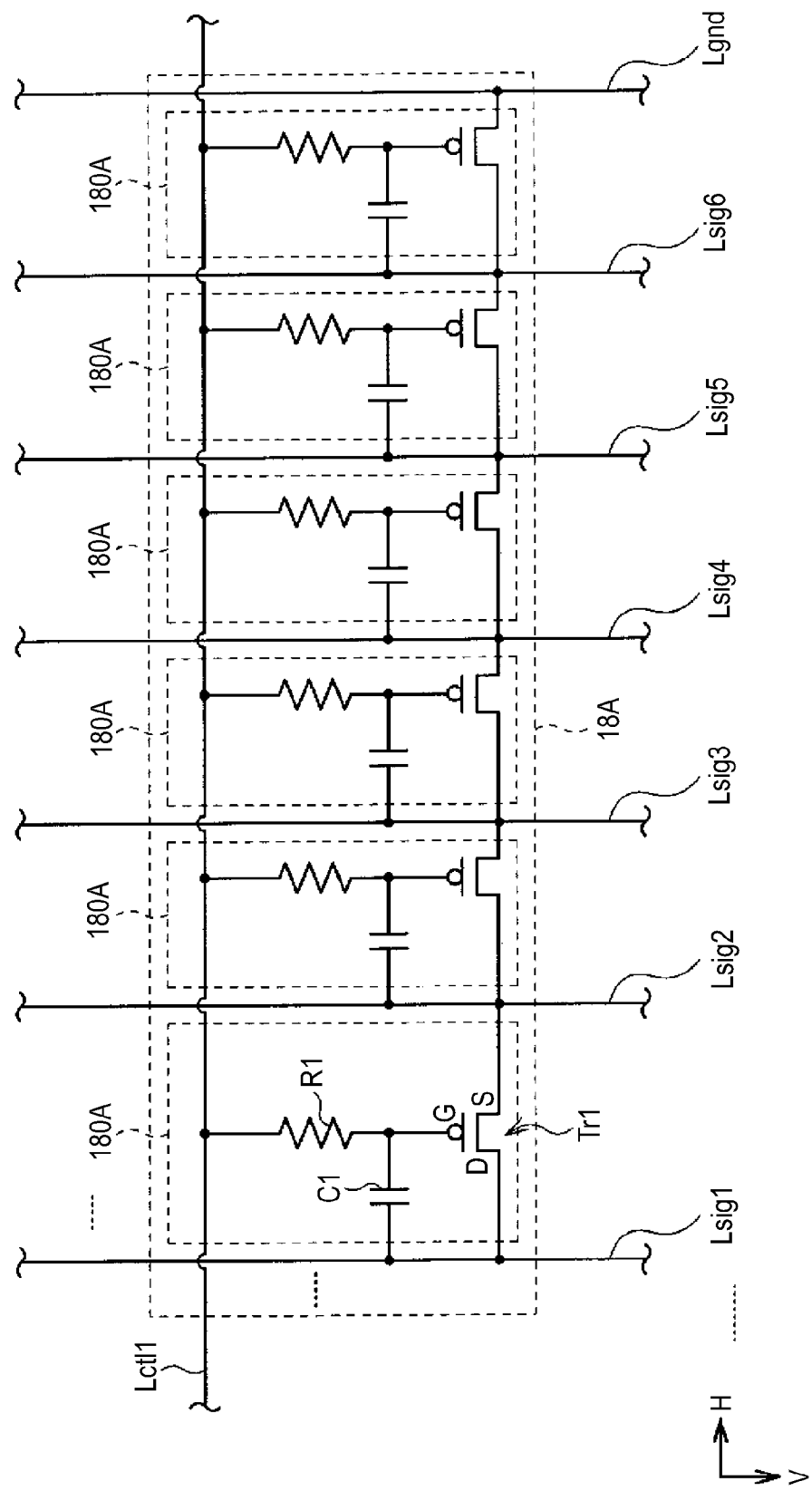
FIG. 13 is a circuit diagram showing a configuration example of an electrostatic discharge protection unit according to a modification example 1.

FIG. 13 shows a circuit configuration of an electrostatic discharge protection unit (electrostatic discharge protection unit 18A) according to a modification example 1. The electrostatic discharge protection unit 18A according to the modification example includes plural unit circuits 180A (electrostatic discharge protection unit) extending along the H-direction.

The unit circuit 180A according to the modification example uses a transistor Tr1 formed by a P-channel (P-type) FET instead of the transistor Tr1 formed by the N-channel (N-type) FET in the unit pixel 180 of the embodiment.

Figure 14:
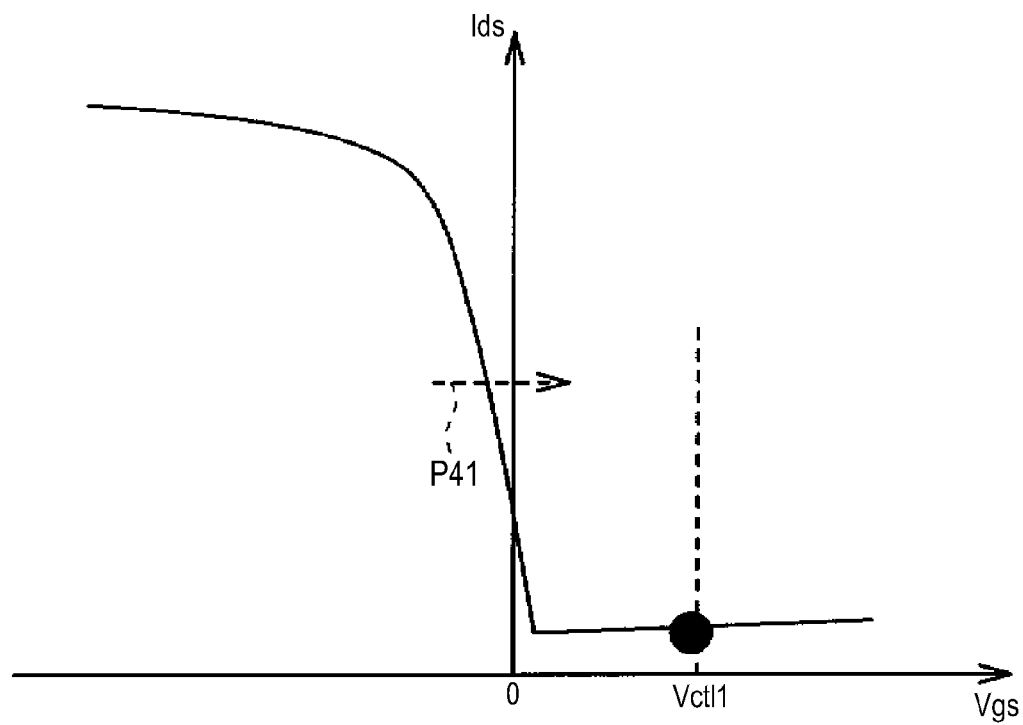
FIG. 14 is a view showing a characteristic example of a transistor shown in FIG. 13.

Also in the modification example, the potential Vctl1 of the potential control line Lctl1 is set so that the transistor Tr is in the off-state when the device power is in the on-state. Specifically, for example, as shown in FIG. 14, the potential Vctl1 of the potential control line Lctl1 is set to be higher than the potential (signal voltage) Vsig of the signal line Lsig so as to satisfy the gate-source voltage Vgs>0 in the transistor Tr1. Also in this case, the potential Vctl1 of the potential control line Lctl1 is set so as to satisfy Vgs>0 even when the potential Vsig of the signal line Lsig changes. Accordingly, as shown by an arrow P41 in FIG. 14, it is possible to suppress leakage current (leakage current in the off-state) in the transistor Tr1 to be low even when the threshold voltage Vth in the transistor Tr1 changes to the positive side to some degree. Therefore, adverse effects (reduction of the charge amount and the like) to the operation of reading out signals (charges) from respective pixels 20 due to the leakage current in the transistor Tr1 can be suppressed when the device power is in the on-state in the same manner as the above embodiment also in the present modification example.

As described above, it is possible to obtain the same effects also in the present modification example by the same operation as the above embodiment. However, particularly when the transistor Tr1 is made of polycrystalline semiconductors (polycrystalline silicon and the like), the transistor Tr1 is desirably the N-channel transistor as in the above embodiment because the leakage current is generally lower in the N-channel than in the P-channel.

Modification Example 2

Figure 15:
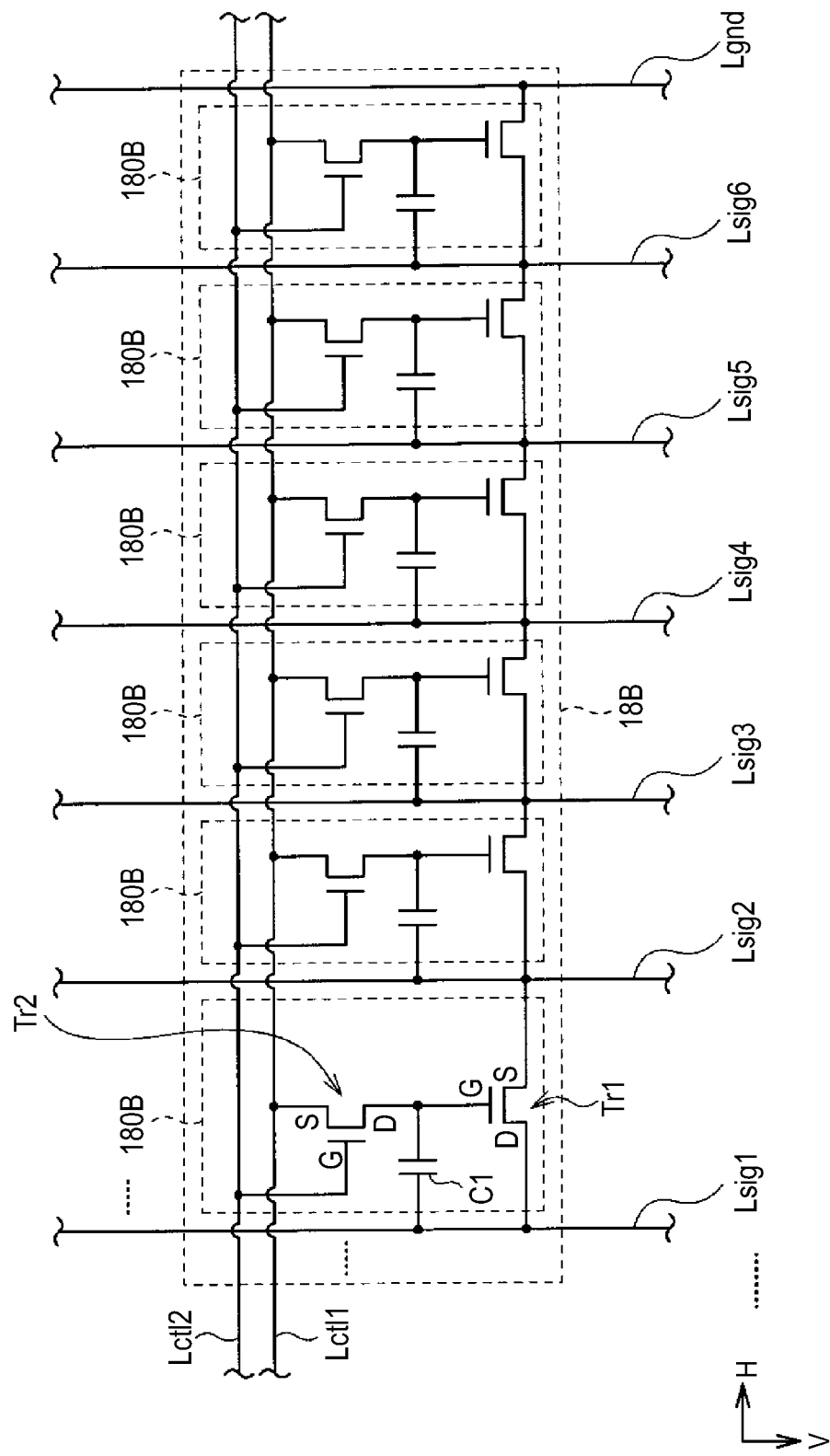
FIG. 15 is a circuit diagram showing a configuration example of an electrostatic discharge protection unit according to a modification example 2.

FIG. 15 shows a circuit configuration of an electrostatic discharge protection unit (electrostatic discharge protection unit 18B) according to a modification example 2. The electrostatic discharge protection unit 18B according to the modification example includes plural unit circuits 180B (electrostatic discharge protection unit) extending along the H-direction.

The unit circuit 180B according to the modification example is provided with a transistor Tr2 (second transistor) instead of the resistor device R1 in the unit circuit 180 in the above embodiment, in which the transistor Tr2 functions as a resistor device. In other words, the resistor device is formed by the transistor Tr2 in the unit circuit 180B. Also in each unit circuit 180B, a protection control line Lctl2 (second control line) extending along the H-direction is also connected in addition to the protection control line Lctl1 explained above.

In the unit circuit 180B, a gate of the transistor Tr1 is indirectly connected to the protection control line Lctl1 through a drain and a source of the transistor Tr2 (one terminal and the other terminal of the resistor device). That is, the source of the transistor Tr2 is connected to the protection control line Lctl1 and the drain of the transistor Tr2 is connected to the gate of the transistor Tr1. The gate of the transistor Tr2 is connected to the protection control line Lctl2. One of the source and the drain (the drain in this case) of the transistor Tr1 is connected to one signal line Lsig1 and one terminal of the capacitor device C1, and the other (the source in this case) is connected to another one wiring lines (the signal line Lsig or the grounding wire Lgnd in this case). The other terminal of the capacitor device C1 is connected to the gate of the transistor Tr1 and the drain of the transistor Tr2.

In the present modification example, the potential of the protection control line Lctl2 is set so that the transistor Tr2 is in the on-state when the device power is in the on-state. Specifically, the potential of the protection control line Lctl2 is set so as to satisfy the gate-source voltage Vgs>0 in the transistor Tr2. Accordingly, it is possible to set the transistor Tr2 to be in the on-state reliably when the device power is in the on-state by using the protection control line Lctl2 in the present modification example.

In the electrostatic discharge protection unit 18B of the present modification example having the above configuration, the transistor Tr2 in each unit circuit 180 is in the on-state when the device power is in the on-state as described above, therefore, a resistance value as the resistor device is relatively low. Therefore, it is possible to increase the operation of returning the gate potential so as to suppress the leakage current in the case where the signal voltage Vsig changes and the gate potential of the transistor Tr1 also changes due to capacitive coupling by the capacitor device C1 at the time of imaging operation.

On the other hand, as the protection control line Lctl2 also becomes in the floating state when the device power is in the off-state, Vgs is nearly equal to "0" which is inverse to the above, therefore, the transistor Tr2 in each unit circuit 180B is in the off-state. Accordingly, the resistance value as the resistor device is relatively high, which can avoid the transistor Tr1 from being turned off in a moment of time and can operate the electrostatic discharge protection unit 18B more positively.

The case where both the transistors Tr1 and Tr2 are formed by the N-channel FET has been explained in the present modification example, however, it is possible to form, for example, at least one of these transistors Tr1 and Tr2 by the P-channel FET.

Modification Example 3

Figure 16:
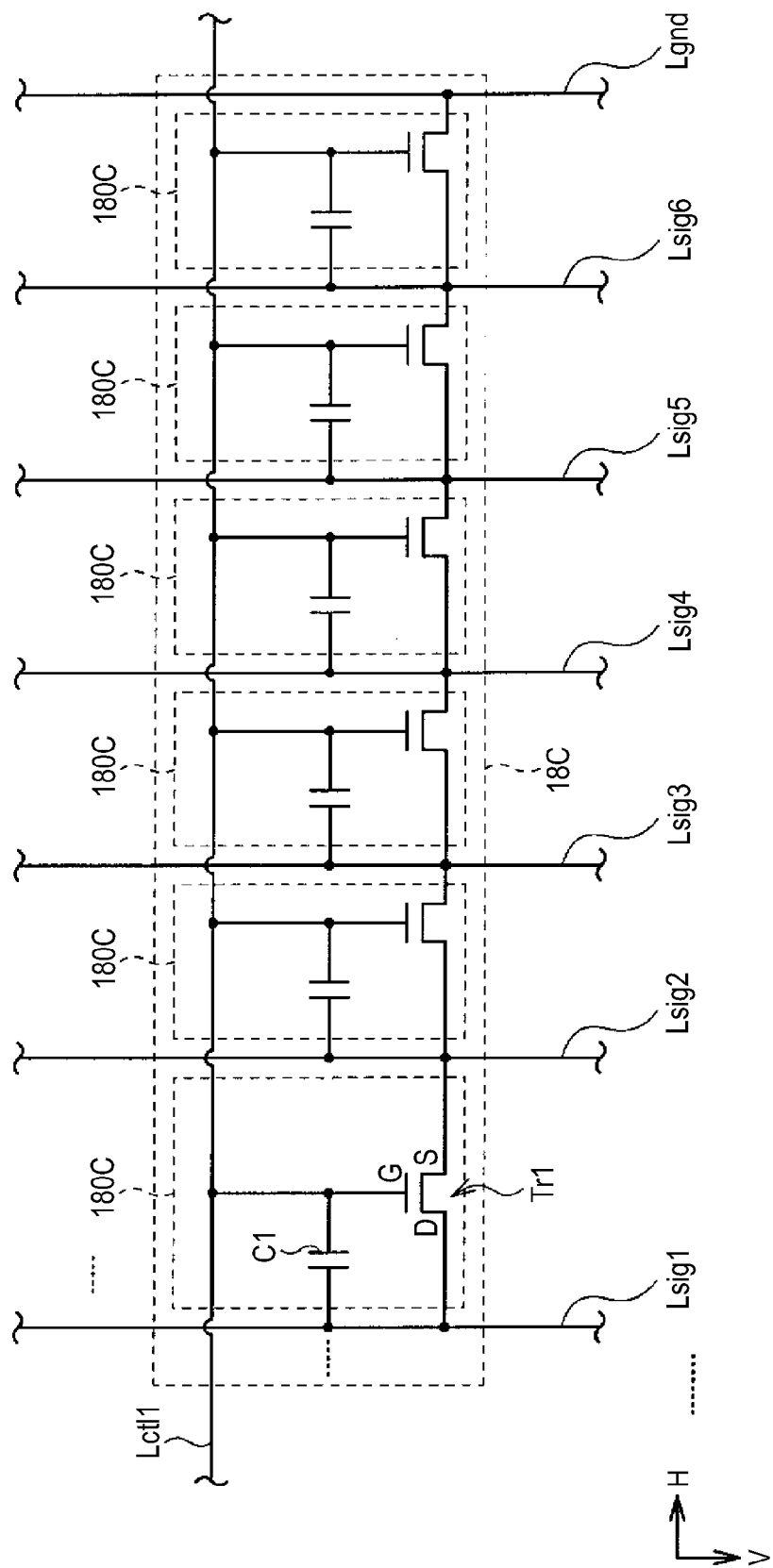
FIG. 16 is a circuit diagram showing a configuration example of an electrostatic discharge protection unit according to a modification example 3.

FIG. 16 shows a circuit configuration of an electrostatic discharge protection unit (electrostatic discharge protection unit 18C) according to a modification example 3. The electrostatic discharge protection unit 18C according to the modification example has plural unit circuits 180C (electrostatic discharge protection circuits) extending in the H-direction.

The unit circuit 180C according to the present modification example is not provided with (omits) the resistor device R1 in the unit circuit 180 of the above embodiment and has the same components other than the resistor device R1. Accordingly, the gate of the transistor Tr1 is directly connected to the protection control line Lctl1 in each unit circuit 180C.

As described above, it is possible that the resistor device is not provided in each unit circuit in the electrostatic discharge protection unit in some cases. However, it is desirable to provide the resistor device because it is possible to avoid the transistor Tr1 from being turned off in a moment of time and to operate the electrostatic discharge protection unit more positively as described above.

The case where the transistor Tr1 is formed by the N-channel FET has been explained in the present modification example, however, it is also possible to form the transistor Tr1 by, for example, the P-channel FET in the same manner as the modification example 1.

Modification Examples 4 to 6

Figure 17A:
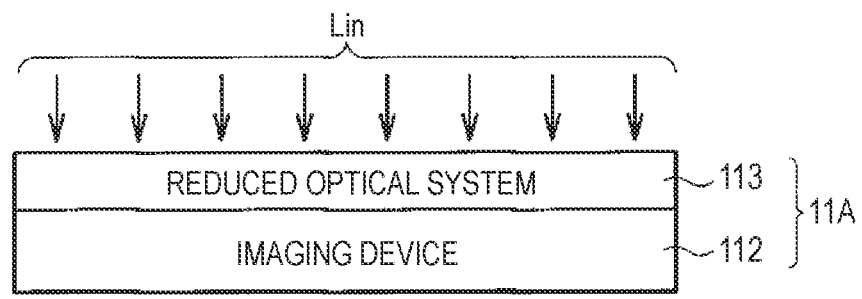
FIGS. 17A to 17C are schematic views showing outline configuration examples of imaging units according to modification examples 4 to 6.
Figure 17B:
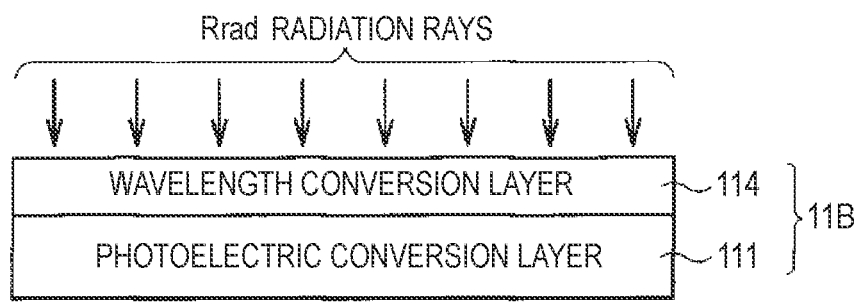
Figure 17C:
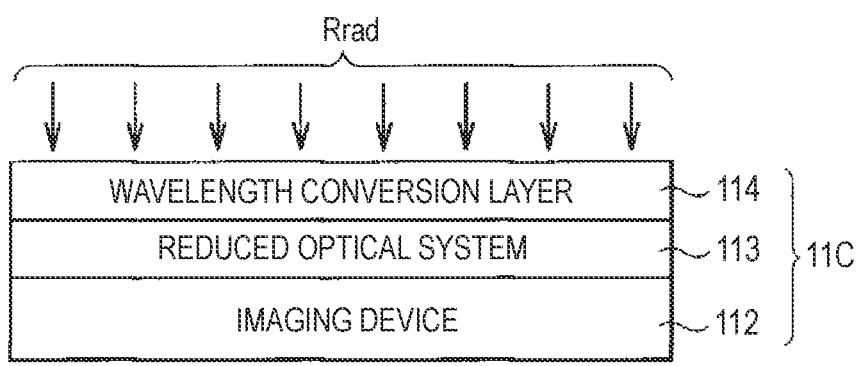

FIGS. 17A to 17C schematically show outline configuration examples of imaging units (imaging units 11A to 11C) according to modification examples 4 to 6 respectively.

The imaging unit 11A according to the modification example 4 shown in FIG. 17A has an imaging device 112 and a reduced optical system 113 instead of the optical conversion layer 111 in the imaging unit 11 of the above embodiment. The imaging device 112 is a device for detecting the imaging light Lin to acquire the output data Dout (imaged signals). The imaging device 112 can be formed by using image sensors such as a CCD (Charge-Coupled Devices) image sensor or a CMOS (Complementary Metal-Oxide Semiconductor) image sensor. The reduced optical system 113 is arranged on a light receiving surface of the imaging device 112 and formed by, for example, a micro-lens array and so on. According to the configuration, it is possible to read information based in the incident imaging light Lin also in the imaging unit 11A of the present modification example in the same manner as the imaging unit 11 of the above embodiment.

The imaging unit 11B according to the modification example 5 shown in FIG. 17B includes a wavelength conversion layer 114 in addition to the photoelectric conversion layer 111 explained in the above embodiment. Specifically, the wavelength conversion layer 114 is provided on the photoelectric conversion layer 111 (the light receiving side of the imaging unit 11B). The imaging unit 11C according to the modification example 6 shown in FIG. 11C includes the wavelength conversion layer 114 in addition to the imaging device 112 and the reduced optical system 113 explained in the above modification example 4. Specifically, the wavelength conversion layer 114 is provided on the reduced optical system 113 (the light receiving side of the imaging unit 11C).

The wavelength conversion layer 114 performs wavelength conversion of radiation rays Rrad (α-ray, β-ray, γ-ray, X-ray and so on) into a sensitivity range of the photoelectric conversion layer 111 or the imaging device 112, which allows the photoelectric conversion layer 111 and the imaging device 112 to read information based on the radiation rays Rrad. The wavelength conversion layer 114 is made of, for example, a fluorescent material (for example, scintillator) converting radiation rays such as X-rays into visible light. The wavelength conversion layer 114 can be obtained by forming a planarization film made of an organic planarization film, a spin-on-glass and so on, for example, on the photoelectric conversion layer 111 or the reduced optical system 113 and forming a fluorescent film made of CsI, NaI, $CaF_2$ and the like on the planarization film.

In imaging apparatus according to the modification examples 5 and 6 including the imaging units 11B and 11C having the above configurations, the imaging units 11B and 11C generate electric signals in accordance with the incident radiation rays Rrad, which are formed as radiation imaging apparatuses. Such radiation imaging apparatus can be applied to, for example, medical equipment (an X-ray imaging apparatus such as a Digital Radiography), an X-ray imaging apparatus for baggage inspection used in an airport and the like, an industrial X-ray imaging apparatus (for example, apparatuses performing inspection of hazardous materials in containers or inspection of contents in bags and the like).

Application Example

Subsequently, an application example of the imaging apparatus according to the embodiment and respective modification examples (modification examples 1 to 6) will be explained.

Figure 18:
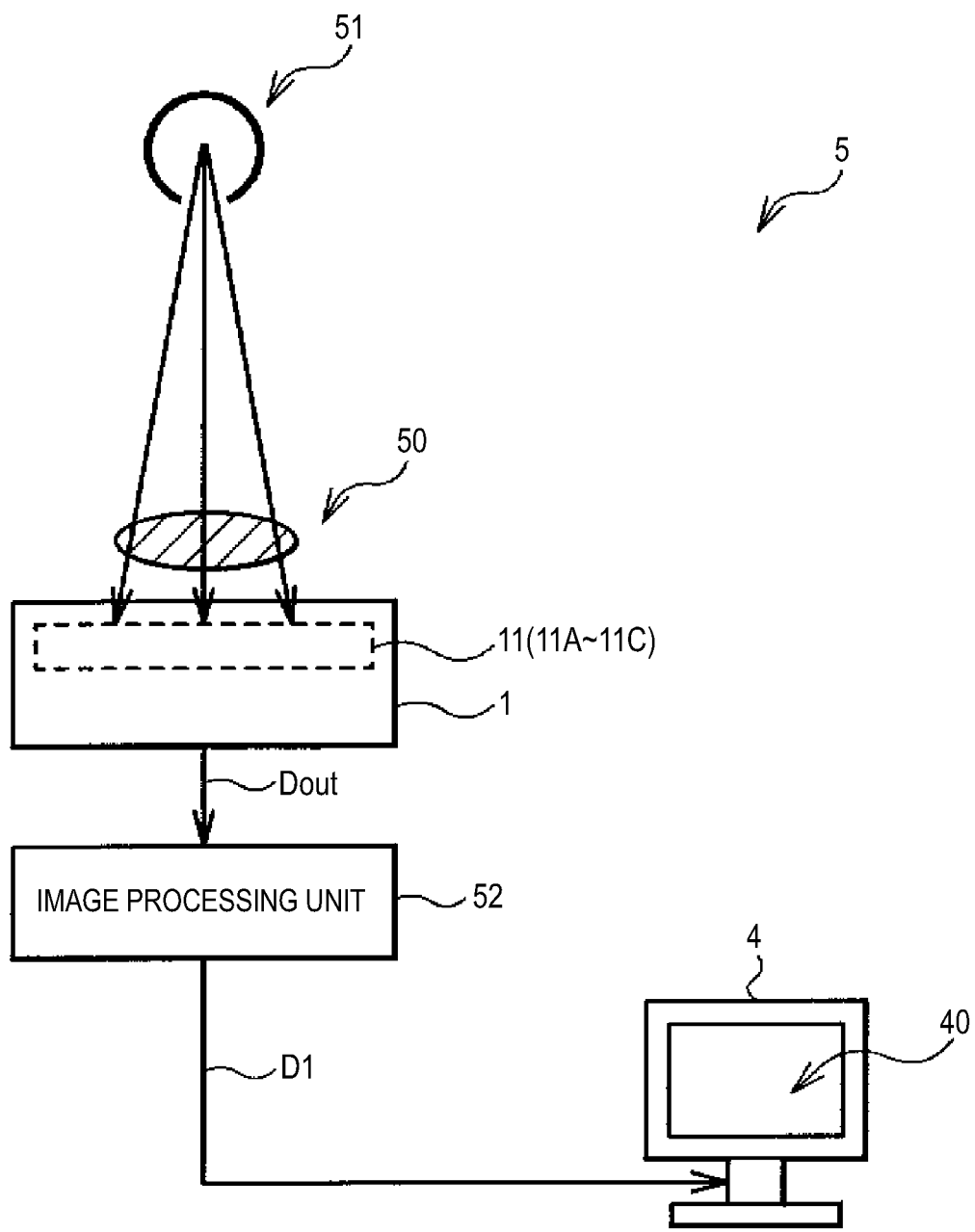
FIG. 18 is a schematic view showing an outline configuration example of an imaging display system according to an application example.

FIG. 18 schematically shows an outline configuration example of an imaging display system (imaging display system 5) according to an application example. The imaging display system 5 includes the imaging apparatus 1 having the imaging units 11 (11A to 11C) and the like according to the above embodiment and so on, an image processing unit 52 and a display device 4, which is configured as the imaging display system using radiation rays in the example.

The image processing unit 52 performs given image processing to the output data Dout (imaging signals) outputted from the imaging apparatus 1, thereby generating image data D1. The display device 4 performs image display based on the image data D1 generated in the image processing unit 52 on a given monitor screen 40.

In the imaging display system 5 having the above configuration, the imaging apparatus 1 (a radiation imaging apparatus in this case) acquires the image data Dout of an object 50 based on radiation rays irradiated toward the object 50 from a radiation source (for example, an X-ray source) 51 and outputs the data to the image processing unit 52. The image processing unit 52 performs the given image processing with respect to the inputted image data Dout and outputs the image data (display data) D1 to which image processing has been performed to the display device 4. The display device 4 displays image information (a taken image) on the monitor screen 40 based on the inputted image data D1.

As described above, the image of the object 50 can be acquired as electric signals in the imaging apparatus 1, therefore, the image display can be performed by transmitting the acquired electric signals to the display device 4. That is, it is possible to observe the image of the object 50 without using a radiographic film in related art, and it is possible to respond to the imaging and the display of moving pictures.

In the present application example, the case where the imaging apparatus 1 is formed as the radiation imaging apparatus which is the imaging display system using radiation rays has been explained as an example, however, the imaging display system according to the embodiment of the present disclosure can be applied to systems using the other-types of imaging apparatuses.

Other Modification Example

Though the present disclosure has been explained by citing the embodiments, the modification example and the application example as the above, the present disclosure is not limited to the embodiment and so on, and various modifications can be performed.

For example, the case where plural unit circuits (electrostatic discharge protection circuits) are provided in the electrostatic discharge protection unit has been explained in the above embodiment and so on, however, it is not limited to this and it is also preferable that only one unit circuit is provided in the electrostatic discharge protection unit.

The circuit configuration of pixels in the imaging unit is not limited to the configuration (circuit configuration of the pixel 20) explained in the above embodiment and so on, and other circuit configurations can be applied. That is, it is also preferable that, for example, the anode of the photoelectric conversion device 21 is connected to the accumulation node N as well as the cathode is connected to the power supply line VDD. It is also preferable that a given source follower circuit is provided in the pixel.

It is further preferable that the imaging unit 11, the row scanning unit 13, the A/D conversion unit 14 (the column selection unit 17), the column scanning unit 15 and the electrostatic discharge protection unit 18 explained in the above embodiment and so on are formed on the same substrate. Specifically, switches and the like in these circuit portions can be formed on the same substrate by using polycrystalline semiconductors such as low-temperature polycrystalline silicon (Si), therefore, driving operation on the same substrate can be performed based on control signals from the external system control unit 16.

Additionally, the imaging apparatus in which plural pixels (imaging pixels) performs the input operation (imaging operation) of signals has been explained as an example of the "signal transmission apparatus" in the present embodiment and the like the present disclosure, however, the present disclosure is not limited to this. That is, the electrostatic discharge protection unit (electrostatic discharge protection circuit) explained in the above embodiment and so on can be applied to the signal transmission apparatus performing at least one of the input operation (imaging operation) and the output operation (display operation) of signals in plural pixels.

Figure 19:
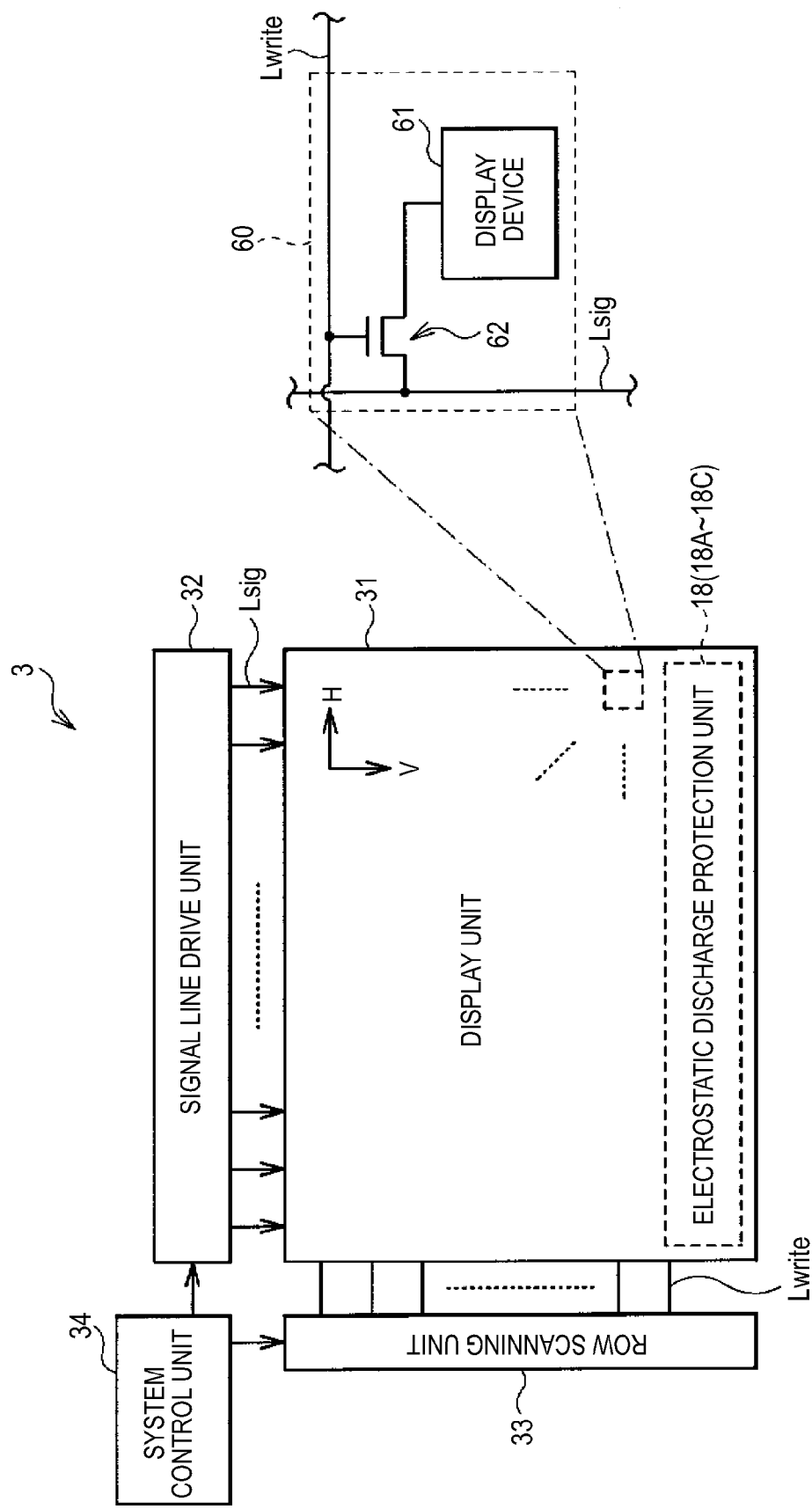
FIG. 19 is a block diagram showing an entire configuration example of a display apparatus according to another modification example of the present disclosure.

Specifically, plural pixels 60 (display pixels) performs output operations (display operations) of signals, for example, in a display apparatus 3 (signal transmission apparatus) shown in FIG. 19. The display apparatus 3 includes a display unit 31 having plural pixels 60, a signal line drive unit 32 (data driver) supplying video signals to the signal lines Lsig, a row scanning unit 33 (gate driver) sequentially scanning the write control lines Lwrite (gate lines) in the V-direction and a system control unit 34. The electrostatic discharge protection unit 18 (18A to 18C) explained in the above embodiment and the like are provided in the display apparatus 3. The system control unit 34 controls operations of the signal line drive unit 32 and the row scanning unit 33. Each pixel 60 has a display device 61 (for example, a liquid crystal device, an organic EL (Electro Luminescence) device and so on) and a transistor 62 as a switching device, to which the signal line Lsig and the write control line Lwrite are connected. Also in the display apparatus 3 having the above configuration, the same effects can be obtained by the same operation as in the above embodiment and the like.

The present disclosure can apply the following configurations.

(1) A signal transmission apparatus includes plural pixels performing at least one of an input operation and an output operation of signals, one or plural signal lines connected to the pixels;

plural wiring lines including signal lines, one or plural electrostatic discharge protection circuits arranged between one signal line and another one wiring line of the plural wiring lines, each having a first transistor and a capacitor device, and a first control line connected to the electrostatic discharge protection circuits, in which, in the electrostatic discharge protection circuit, a gate of the first transistor is connected to the first control line directly or indirectly, one of a source and a drain in the first transistor is connected to one signal line and one terminal of the capacitor device as well as the other is connected to another one wiring line, and the other terminal of the capacitor device is connected to the gate of the first transistor.

(2) The signal transmission apparatus described in the above (1), in which the electrostatic discharge protection circuit further includes a resistor device, and one terminal of the resistor device is connected to the first control line and the other terminal of the resistor device is connected to the gate of the first transistor and the other terminal of the capacitor device.

(3) The signal transmission apparatus described in the above (2), in which the resistor device is formed by a second transistor.

(4) The signal transmission apparatus described in the above (3),
in which one terminal and the other terminal of the resistor device are a source or a drain of the second transistor, and
a second control line is connected to a gate of the second transistor.

(5) The signal transmission apparatus described in the above (4),
in which a potential of the second control line is set so that the second transistor is in an on-state when a device power is in the on-state.

(6) The signal transmission apparatus described in the above (1),
in which a potential of the first control line is set so that the first transistor is in an off-state when the device power is in the on-state.

(7) The signal transmission apparatus described in any one of the above (1) to (6),
in which another one wiring line is another one signal line, one power supply line or one grounding wire of the plural wiring lines.

(8) The signal transmission apparatus described in the above (7),
in which the plural electrostatic discharge protection circuits include
one or plural first protection circuits arranged between one signal line and another one signal line, and
one or plural second protection circuits arranged between one signal line and one power supply line or one grounding wire.

(9) The signal transmission apparatus described in the above (8),
in which the first protection circuits and the second protection circuits are continuously arranged between adjacent plural wiring lines.

(10) The signal transmission apparatus described in any one of the above (1) to (9),
in which the plural pixels perform an imaging operation as the input operation of signals, which are configured as an imaging apparatus.

(11) The signal transmission apparatus described in the above (10),
in which the plural pixels generate electric signals in accordance with incident radiation rays as the imaging operation, which are configured as a radiation imaging apparatus.

(12) The signal transmission apparatus described in the above (11),
in which the radiation rays are X-rays.

(13) The signal transmission apparatus described in any one of the above (1) to (9),
wherein the plural pixels perform a display operation as the output operation of signals, which are configured as a display apparatus.

(14) An imaging display system including
an imaging apparatus, and
a display device performing image display based on imaging signals obtained by the imaging apparatus,
in which the imaging apparatus has
plural pixels performing an imaging operation,
one or plural signal lines connected to the pixels,
plural wiring lines including the signal lines,
one or plural electrostatic discharge protection circuits arranged between one signal line and another one wiring line of the plural wiring lines, each having a first transistor and a capacitor device, and
a first control line connected to the electrostatic discharge protection circuits,
in which, in the electrostatic discharge protection circuit, a gate of the first transistor is connected to the first control line directly or indirectly,
one of a source and a drain in the first transistor is connected to one signal line and one terminal of the capacitor device as well as the other is connected to another one wiring line, and
the other terminal of the capacitor device is connected to the gate of the first transistor.

The present disclosure contains subject matter related to that disclosed in Japanese Priority Patent Application JP 2011-114827 filed in the Japan Patent Office on May 23, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmission apparatus comprising:
a plurality of pixels, each pixel of the plurality of pixels configured to perform at least one of an input operation and an output operation;
one or more signal lines connected to each pixel of the plurality of pixels;
a plurality of wiring lines, wherein the plurality of wiring lines include at least one of a signal line, a power line, and a grounding wire line;
one or more electrostatic discharge protection circuits arranged between a signal line of the one or more signal lines and a wiring line of the plurality of wiring lines, wherein each electrostatic discharge protection circuit includes a transistor and a capacitor device; and
a control line connected to the one or more electrostatic discharge protection circuits,
wherein,
a gate of the transistor is electrically connected to the control line,
at least one of a source and a drain of the transistor is connected to the signal line of the one or more signal lines and a first terminal of the capacitor device,
the other of the source and drain of the transistor is connected to the wiring line of the plurality of wiring lines, and
a second terminal of the capacitor device is connected to the gate of the first transistor.

2. The signal transmission apparatus according to claim 1, wherein the electrostatic discharge protection circuit further includes a resistor device, and
a first terminal of the resistor device is connected to the first control line and a second terminal of the resistor device is connected to the gate of the transistor and the second terminal of the capacitor device.

3. The signal transmission apparatus according to claim 2, wherein the resistor device is a second transistor.

4. The signal transmission apparatus according to claim 3, wherein the first terminal of the resistor device is a source or a drain of the second transistor and the second terminal of the resistor device is the other of the source or the drain of the second transistor, and
a second control line is connected to a gate of the second transistor.

5. The signal transmission apparatus according to claim 4, wherein a potential of the second control line is set so that the second transistor is in an on-state when a device power is in the on-state.

6. The signal transmission apparatus according to claim 1, wherein a potential of the control line is set so that the first transistor is in an off-state when the device power is in the on-state.

7. The signal transmission apparatus according to claim 1, wherein the one or more electrostatic discharge protection circuits include a first protection circuit arranged between the signal line of the one or more signal lines and a second signal line of the one or more signal lines, and
a second protection circuit is arranged between the signal line of the one or more signal lines and one of a power supply line or a grounding wire.

8. The signal transmission apparatus according to claim 7, wherein the first protection circuit and the second protection circuit are continuously arranged between adjacent wiring lines of the plurality of wiring lines.

9. The signal transmission apparatus according to claim 1, wherein the plurality of pixels are configured to perform an imaging operation.

10. The signal transmission apparatus according to claim 9, wherein the plurality of pixels are configured to generate electric signals in accordance with incident radiation rays during the imaging operation.

11. The signal transmission apparatus according to claim 10, wherein the radiation rays are X-rays.

12. The signal transmission apparatus according to claim 1, wherein the plurality of pixels are configured to perform a display operation.

13. An imaging display system comprising:
an imaging apparatus; and
a display device configured to display an image based on imaging signals obtained by the imaging apparatus,
wherein the imaging apparatus includes a plurality of pixels configured to perform an imaging operation,
one or more signal lines connected to each pixel of the plurality of pixels,
plural plurality of wiring lines, wherein the plurality of wiring lines include at least one of a signal line, a power line, and a grounding wire line,
one or more electrostatic discharge protection circuits arranged between a signal line of the one or more signal lines and a wiring line of the one or more plurality of wiring lines, wherein each electrostatic discharge protection circuit includes a transistor and a capacitor device, and
a control line connected to the one or more electrostatic discharge protection circuits,
wherein,
a gate of the transistor is electrically connected to the control line,
at least one of a source and a drain of the transistor is connected to the signal line of the one or more signal lines and a first terminal of the capacitor device,
the other of the source and drain of the transistor is connected to the wiring line of the plurality of wiring lines, and
a second terminal of the capacitor device is connected to the gate of the first transistor.

* * * * *